Patented Sept. 16, 1941

2,256,442

UNITED STATES PATENT OFFICE 2,256,442

MINERAL OIL COMPOSITION AND IMPROVING AGENT THEREFOR

Orland M. Reiff, Woodbury, N. J., assignor to Socony-Vacuum Oil Company, Incorporated, New York, N. Y., a corporation of New York No Drawing. Application March 9, 1940, Serial No. 323,118

20 Claims. (Cl. 252—46)

This invention has to do in a general way with mineral oil compositions and is more particularly related to mineral oil compositions of the lubricant and dielectric types to which an agent has been added for the purpose of improving the oil in certain respects. It is an object of this invention to provide a novel class of mineral oil addition agents which when added to an oil will effect improvement in several unrelated properties, and it is a further object to provide mineral oil compositions containing such improving agents.

In my copending application Serial No. 247,001, filed December 21, 1938, Patent No. 2,197,837, issued April 23, 1940, of which this application is a continuation in part, I have disclosed as mineral oil-improving agents alkyl-substituted hydroxyaromatic carboxylic acids wherein the alkyl substituent is derived from an aliphatic hydrocarbon or a predominantly aliphatic material containing at least 20 carbon atoms. These compounds, as pointed out in the aforesaid application, when added to a viscous mineral oil fraction are effective to improve the properties of the mineral oil in several respects, such as depression of pour point, improvement of viscosity index, and inhibition of the deleterious effects of oxidation.

The present invention is based upon the discovery that the alkyl- or wax- substituted hydroxyaromatic acids of my former application can be further improved in certain of their various properties by the formation therefrom of condensation products of sulfur, selenium, or tellurium. The addition agents of the present invention, therefore, are, like those of my copending application, characterized by the presence of an hydroxyaromatic nucleus containing a carboxyl group and having at least one nuclear hydrogen atom substituted with an aliphatic hydrocarbon group containing at least 20 carbon atoms. The compounds of the present invention are distinguished from those of my copending application in that they are further characterized by the fact that at least two of the alkylated aryl nuclei are interconnected by at least one atom of an element selected from the group consisting of sulfur, selenium, and tellurium. The preferred group of compounds or condensation products contemplated herein is the sulfides, and for purposes of description and definition these condensation products may be termed oil-miscible sulfides of alkyl-substituted hydroxyaromatic acids in which the alkyl substituent is derived from an aliphatic hydrocarbon of at least 20 carbon atoms. In this regard it is to be understood that the term sulfide is inclusive of both mono- and poly- sulfides, and, as aforesaid, the invention contemplates the related derivatives of selenium and tellurium.

The condensation products contemplated herein may be characterized by the general formula:

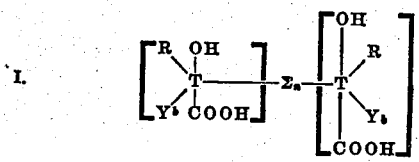

in which T represents a mono- or poly- cyclic aromatic nucleus; Σ represents sulfur, selenium, or tellurium; and $n$ represents a whole number from one to four. R represents at least one aliphatic hydrocarbon radical containing at least 20 carbon atoms; and $Y_b$ represents residual hydrogen or a substituent group in the aryl nucleus T, as will be hereinafter more fully described.

As aforesaid, the multifunctional oil-improving properties of these compounds are obtained from the heavy alkyl substituent R, which I have discovered should be at least 20 carbon atoms and which contributes to the properties of pour point depression and viscosity index improvement. This heavy alkyl group, as will be hereinafter pointed out, and as was explained in my aforesaid copending application, may be derived from a pure or substantially pure high molecular weight aliphatic hydrocarbon, or it may be derived from a mixture of such hydrocarbons such as is found in petroleum wax. Inasmuch as petroleum wax constitutes a preferred source for these compounds, the reaction product will be referred to herein as "wax-substituted," but it is to be understood that the term wax as employed herein is of general application and includes in addition to petroleum wax related compounds or mixtures of compounds predominantly comprised of heavy alkyl groups.

It is important, as is also explained in detail in my copendng application, that the wax or heavy alkyl substituent comprise a sufficient proportion of the compound or composition as a whole to render it oil-soluble or oil-miscible. By the term oil-soluble or oil-miscible, as used herein, I have reference to that property of the addition agent of remaining in solution or in colloidal suspension in the oil under normal conditions of storage and use.

In addition to the oil-solubilizing alkyl or wax group R, the aryl nucleus may contain residual hydrogen part or all of which may in turn be substituted with other groups which may have negative or positive or neutral oil-solubilizing effect, or the hydrogen content may be increased by addition of hydrogen by hydrogenating the compound. Such hydrogen or substituents thereof are, as aforesaid, indicated by $Y_b$ in the foregoing general formula, Y representing additive or residual hydrogen or a radical selected from the group consisting of hydroxy, ester, xanthate, alkyl sulfides, keto, alkoxy, aroxy, ether alcohol, aldehyde, oxime, amide, thioamide, carbamide, aralkyl, aryl, alkaryl, halogen, nitroso, amino, nitrosamine, amidine, imine, N-thio, diazo, hydrazine, cyano, azoxy, azo, and hydrazo radicals; b represents the number of Y substituents and is equal to zero or a whole number corresponding to replaceable hydrogens on the nucleus T not substituted with R, OH, COOH and $\Sigma_n$.

As aforesaid, the aryl nucleus T may be mono- or poly- cyclic, corresponding, for example, to phenol, hydroxy-diphenyl, naphthol, anthrol, etc., and their derivatives. A preferred condensation product derived from wax-substituted phenol carboxylic acid may in its simplest form be represented by the general formula:

II.
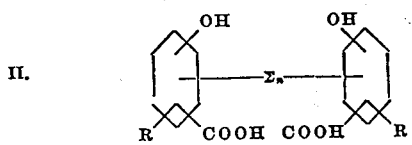

Since the condensation reaction employed in synthesizing the sulfides contemplated herein may be attended by a certain amount of further condensation beyond that indicated in formula II, such further condensed compounds, hereinafter referred to as polymers, are contemplated herein as coming within the term sulfides and as coming within the compounds represented by general formula I. Polymers of this character which may be associated with or formed instead of the simple condensed compounds of formula I may be represented by the following formula:

III.
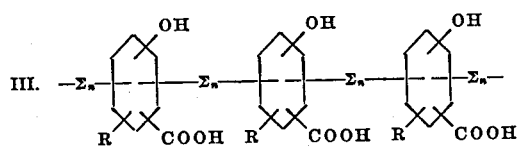

Also, as was pointed out in my aforesaid co-pending application, the alkylation of the aryl nucleus by a prefered procedure which involves the Friedel-Crafts condensation of a halogenated petroleum wax or equivalent halogenated high molecular weight aliphatic hydrocarbons or mixture thereof with a hydroxyaromatic compound may result in the formation of compounds in which two or more of the aryl nuclei are interconnected by one or more aliphatic hydrocarbon chains. Compounds of this type, when further reacted to obtain the sulfides of the hydroxyaromatic carboxylic acid may result in the formation of compounds corresponding to the formulae IV and V below, in which the chains represent aliphatic hydrocarbon groups corresponding to R.

IV.
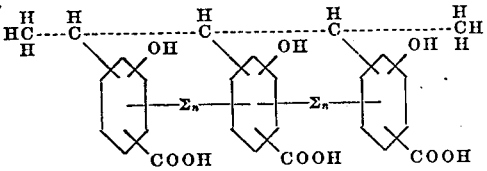

V.
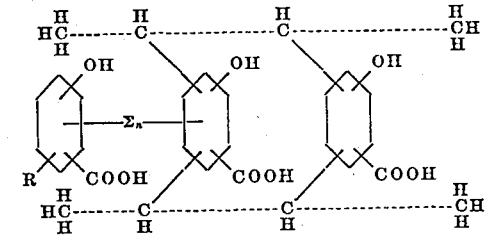

The foregoing discussion is not intended as a development of the specific molecular composition or structure of the wax-substituted hydroxyaromatic acid sulfides contemplated herein as mineral oil addition agents but is intended to be indicative of the possible molecular composition of such addition agents. The representative compounds illustrated by the general formulae II to V inclusive are typical of compounds comprehended by the defining term "sulfides" as used herein, and it will be observed that each of these typical compounds is characterized by having therein at least one group corresponding to general formula I. As aforesaid, the term sulfide is inclusive of the monosulfides, disulfides, trisulfides, or tetrasulfides—that is, it includes both monosulfides and polysulfides and mixtures thereof—and it is also intended to include such polymers and related derivatives as may be formed by the hereinafter described procedures employed to illustrate the synthesis of the addition agents contemplated by the invention.

The general procedure to be followed in synthesizing the sulfides of alkylated hydroxyaromatic acids is to react the corresponding alkylated hydroxyaromatic acid with sulfur halide and then water-wash the reaction product to remove the hydrochloric acid formed in this reaction; or preferably to react the alkali salt of the acid formed by the direct carboxylation of the alkylated hydroxyaromatic compound, with sulfur halide, followed by neutralizing and water-washing the mixture. The use of the alkali salt instead of the free acid results in formation of a product of improved color. Suitable sulfur halides are the sulfur chlorides, and when sulfur dichloride is used, the condensation product will be in the nature of a monosulfide or a polymer thereof; sulfur monochloride will yield the corresponding disulfide or polymer thereof; and of course a mixture of sulfur monochloride and sulfur dichloride may be employed to yield a corresponding mixture of the condensation products. Elementary sulfur may be employed as a condensation reagent, but this is not considered the most desirable procedure.

Sulfur derivatives of higher sulfur content may be obtained by reacting a compound or condensation product having the mono- or disulfide linkage with alkali polysulfides or with alkyl tetrasulfide. Such higher sulfur derivatives may also be obtained by first reducing the disulfide to form a mercaptan of the alkyl hydroxyaromatic acid and then reacting the mercaptan group with sulfur dichloride or sulfur monochloride to form the corresponding trisulfides and tetrasulfides, respectively.

Detailed procedures which may be employed in obtaining the alkyl-substituted hydroxyaromatic acids are set forth in my copending application Serial No. 247,001. In general this procedure involves first the formation of the alkyl- or wax-substituted hydroxyaromatic compound. This is preferably accomplished by condensing a chlorinated petroleum wax of from 10 per cent to 16 per cent chlorine content with the phenol or hydroxyaromatic compound in the presence of a Friedel-Crafts catalyst, such as anhydrous aluminum chloride, and at elevated temperature. The product thus obtained is a wax-substituted phenol, and, as pointed out in my copending application, a specific product obtained according to the procedure may be identified as wax-phenol (3–16), the numeral 3 indicating the number of atomic proportions of chlorine in the chlorwax reacted with one molecular proportion of phenol. The numeral 16 indicates the per cent chlorine content of the chlorwax. Thus, the parenthetical expression (A—B) will be used herein to indicate (A) the ratio of chlorine to phenol in the reaction mixture and (B) the percentage of chlorine in the chlorwax.

The conversion of the wax-phenol to the corresponding wax-phenolic acid may be accomplished by the Kolbe synthesis, details of which are also described in the aforesaid copending application. Preferably, this involves first converting the wax-phenol to a wax-alkali phenate, followed by carboxylation and neutralization of the alkali carboxylate thus formed with a mineral acid.

Where it is desired to obtain a compound or condensation product in which the aryl nucleus contains in addition to or instead of hydrogen a substituent of the type classified in general Formula I as $Y_b$, it is pointed out that with the exception of substituents such as aralkyl, aryl, alkaryl, halogen, hydroxyl, and aroxy, such Y groups are introduced after alkylating and carboxylating the hydroxyaromatic compound. The usual methods for the introduction of these substituents into hydroxyaromatic compounds may be employed in connection with the alkylated and carboxylated hydroxyaromatic compounds contemplated herein.

Procedures for obtaining the sulfur, selenium, and tellurium condensation products contemplated herein are illustrated by a procedure which may be followed in synthesizing the sulfides, wherein a wax-substituted hydroxyaromatic acid such as wax-phenolic acid is dissolved in a suitable solvent such as carbon disulfide, benzene, chlorbenzene, ethylene dichloride, or the like, and a sulfur halide such as sulfur monochloride or sulfur dichloride is slowly added thereto in an amount sufficient to effect the desired condensation. A typical reaction mixture for accomplishing this result is as follows:

Alkylated hydroxyaromatic acid____mol__ 1
Sulfur monochloride or sulfur dichloride_____mol__ .5 to 1
Solvent_____parts by weight__ 1

In a preferred procedure the alkylated phenolic acid solution is brought to a temperature of about 100° F., followed by addition of the sulfur halide during about a ½-hour period. The mixture is then held at this temperature during a period of 1 hour or more to complete the formation of the sulfide derivative. Hydrochloric acid is evolved in the reaction, resulting in fixation of the sulfur in the aryl nucleus. After completion of the condensation reaction the mixture is water-washed to remove the dissolved hydrochloric acid, followed by distillation to remove the diluent and give the finished product.

As regards the temperature referred to above, it is pointed out that this reaction can be carried out at temperatures varying from room temperature up to the boiling point of the solvent, but it is preferable for the obtainment of light-colored products that the temperature be not too high.

In general, as indicated by the procedure of my aforesaid copending application, it is preferable to carry out the formation of the wax-hydroxyaromatic acid in the presence of a diluent such as mineral oil, and in case such a diluent is used, it will be understood that the final product obtained according to the foregoing procedure is a solution of the wax-hydroxyaromatic sulfide in mineral oil.

When the sodium salt of the alkylated phenolic acid, in place of the free acid itself, is sulfurized by reaction with sulfur halides, solvents such as carbon disulfide and ethylene chloride which are reactive with the sodium salt, cannot be used. In this case, solvents such as alcohols, benzene, and chlorbenzene are suitable. The sulfurization is carried out as above, neutralizing the sulfur compound with mineral acid to remove any unreacted sodium and water-washing the mixture. Any solvent remaining is removed by steaming or other methods of distillation to give the finished sulfide of the free acid.

As pointed out above, the disulfide product obtained according to the foregoing procedures, when sulfur monochloride is used as the reactant, can be converted to the higher sulfides by procedures previously outlined, the details of which are well known to those skilled in the art.

Alkylated or wax-substituted hydroxyaromatic acid sulfide of the type obtained according to the foregoing procedure, in which the aryl nucleus is substituted with petroleum wax or other equivalent heavy aliphatic hydrocarbon groups, may be admixed with mineral oil fractions in minor amounts from about $\frac{1}{8}$ per cent to about 10 per cent to obtain mineral oil blends of improved pour point and viscosity index, such oil blends also being stabilized against the deleterious effects of oxidation which, for example, are manifested in an internal combustion engine by the formation of sludge, acid, and the so-called lacquer, which causes ring-sticking, etc. These oil blends, therefore, have improved pour point and viscosity index, and when used in internal combustion engines show marked decrease in the tendency toward formation of acid and sludge and a further decrease in the tendency to cause piston ring-sticking and plugging of the slots in the oil rings.

To demonstrate the improved properties obtained in mineral oil blends containing addition agents of the type discussed herein, I have conducted several comparative tests with representative mineral oils alone and with blends thereof containing the improving agents. The results of these tests are discussed below in the following examples.

EXAMPLE 1

POUR POINT DEPRESSION

This test was conducted with a motor oil having a Saybolt viscosity of 67 seconds at 210° F. and a pour point of +20° F. The pour points of blends formed from this oil and representative wax-substituted hydroxyaromatic sulfides are listed in Table I below, where it will be observed that the addition agents contemplated herein are highly effective pour point depressants.

Table I

| Addition agent | Conc. by wt. | A. S. T. M. pour point |
|---|---|---|
|  | Percent | °F. |
| None | --- | +20 |
| Wax-phenolic acid disulfide (3–16) | ⅛ | −20 |
| Wax-phenolic acid monosulfide (3–16) | ⅛ | −20 |
| Wax-phenolic acid tetrasulfide (3–16) | ⅛ | −15 |
| Wax-alpha-naphtholic acid monosulfide (3–15) | ⅛ | −20 |
| Wax-alpha-naphtholic acid disulfide (3–15) | ⅛ | −10 |

EXAMPLE 2

VISCOSITY INDEX IMPROVEMENT

The data listed in Table II below showing the effectiveness of the wax-hydroxyaromatic acid sulfides as viscosity index improvers were obtained in the conventional manner from the Saybolt viscosity of the oil and the oil blends at 100° F. and 210° F. The oil used was a viscous mineral oil fraction of the lubricant type.

Table II

| Addition agent | Conc. by wt. | Say. visc. 100° F. | Say. visc. 210° F. | V. I. |
|---|---|---|---|---|
|  | Percent |  |  |  |
| None | 0 | 140.7 | 41.8 | 79.3 |
| Wax-phenolic acid disulfide (3–16) | 1 | 151.7 | 42.8 | 87.7 |
| Wax-phenolic acid tetrasulfide (3–16) | 1 | 145.3 | 42.4 | 88.1 |
| Wax-alpha-naphtholic acid disulfide (3–15) | 1 | 148.2 | 42.8 | 93.4 |

EXAMPLE 3

OPERATION TEST

In addition to the foregoing tests I have also made comparative tests between an oil and an oil blend containing representative improving agents of the type contemplated herein to determine the comparative behavior of the unblended oil and the improved oil under actual operating conditions. The test was carried out in a single cylinder C. F. R. engine operated continuously over a time interval of 28 hours with the cooling medium held at a temperature of about 290° F. and the oil temperature held at about 150° F. The engine was operated at a speed of 1200 R. P. M.

The oil used in the test was a lubricating oil stock of 120 seconds Saybolt viscosity at 210° F., and the conditions observed were:

(a) The extent to which the piston rings were stuck;
(b) The extent to which the slots in the oil rings were filled with deposit;
(c) The amount of carbonaceous deposits in the oil; and
(d) The neutralization number or acidity (N. N.) of the oil.

The results set forth in this test are set forth in Table III below.

In making the test runs from which the data in Table III were obtained comparative tests were made with a blank oil sample and a sample of the same oil containing 2½ per cent of the wax-phenolic acid disulfide (3–16). In the table below the blank oil is indicated as oil A and the blend is indicated as oil B.

Table III

| Oil | Ring condition | | | | | | | | Carbon | N. N. |
|---|---|---|---|---|---|---|---|---|---|---|
|  | Degrees stuck | | | | | Percent slots filled | | | | |
|  | 1 | 2 | 3 | 4 | 5 | 3 | 4 | 5 | Grams |  |
| A | 0 | 0 | 360 | 360 | 0 | 80 | 60 | 30 | 9.5 | 1.4 |
| B | 0 | 0 | 0 | 0 | 0 | 0 | 0 | 0 | 4.4 | 0.2 |

As aforesaid, the sulfides of wax-substituted hydroxyaromatic carboxylic acids may be used in the oil in amounts ranging from $\frac{1}{16}$ per cent to about 10 per cent, depending upon the character of the oil, the conditions under which it is to be used, and the properties which it is desired to improve.

It is to be understood that while I have herein described a preferred procedure which may be followed in the preparation of the sufide and related selenide and telluride condensation products contemplated herein as oil addition agents and have referred to my copending application Serial No. 247,001 for further details in certain procedures and representative reactants which may be employed in obtaining the wax-substituted hydroxyaromatic acids from which these condensation products are obtained, such procedures and examples have been used for illustrative purposes only. This invention, therefore, is not to be considered as limited to the specific examples given or referred to but includes within its scope such changes and modifications as fairly come within the spirit of the appended claims.

I claim:

1. An improved mineral oil composition comprising a mineral oil having admixed therewith a minor proportion of an oil-miscible condensation product of a wax-substituted hydroxyaromatic acid in which at least two wax-substituted aryl nuclei are interconnected by at least one atom of an element from the group consisting of sulfur, selenium, and tellurium.

2. An improved mineral oil composition comprising a mineral oil having admixed therewith a minor proportion of an oil-miscible condensation product of a wax-substituted hydroxyaromatic acid in which at least two wax-substituted aryl nuclei are interconnected by at least one atom of sulfur.

3. An improved mineral oil composition comprising a mineral oil having admixed therewith a minor proportion of an oil-miscible sulfide of an alkyl-substituted hydroxyaromatic acid in which at least two substituted aryl nuclei are interconnected by at least one atom of sulfur and in which the alkyl substituent is derived from an aliphatic hydrocarbon of at least twenty carbon atoms.

4. An improved mineral oil composition comprising a mineral oil having admixed therewith a minor proportion of an oil-miscible monosulfide of an alkyl-substituted hydroxyaromatic acid in which at least two substituted aryl nuclei are interconnected by an atom of sulfur and in which the alkyl substituent is derived from an aliphatic hydrocarbon of at least twenty carbon atoms.

5. An improved mineral oil composition comprising a mineral oil having admixed therewith a minor proportion of an oil-miscible polysulfide of an alkyl-substituted hydroxyaromatic acid in which at least two substituted aryl nuclei are interconnected by at least two atoms of sulfur and in which the alkyl substituent is derived from an aliphatic hydrocarbon of at least twenty carbon atoms.

6. An improved mineral oil composition comprising a mineral oil having admixed therewith a minor proportion of an oil-miscible sulfide of an alkyl-substituted hydroxyaromatic acid in which at least two substituted aryl nuclei are interconnected by at least one atom of sulfur and in which the alkyl substituent is derived from petroleum wax.

7. An improved mineral oil composition comprising a mineral oil having admixed therewith in minor proportion, from about 1/8 per cent to about 10 per cent, an oil-miscible sulfide of an alkyl-substituted hydroxyaromatic acid in which at least two substituted aryl nuclei are interconnected by at least one atom of sulfur and in which the alkyl substituent is derived from an aliphatic hydrocarbon of at least twenty carbon atoms.

8. An improved mineral oil composition comprising a mineral oil having admixed therewith in minor proportion, from about 1/8 per cent to about 10 per cent, an oil-miscible sulfide of an alkyl-substituted hydroxyaromatic acid in which at least two substituted aryl nuclei are interconnected by at least one atom of sulfur and in which the alkyl substituent is derived from petroleum wax.

9. An improved mineral oil composition comprising a mineral oil having admixed therewith in minor proportion, from about 1/8 per cent to about 10 per cent, a wax-substituted phenolic acid sulfide in which at least two substituted phenol nuclei are interconnected by at least one atom of sulfur.

10. An improved mineral oil composition comprising a mineral oil having admixed therewith in minor proportion, from about 1/8 per cent to about 10 per cent, a wax-substituted naphtholic acid sulfide in which at least two substituted naphthol nuclei are interconnected by at least one atom of sulfur.

11. An improved mineral oil composition comprising a mineral oil having admixed therewith in minor proportion a condensation compound characterized by having at least once therein the grouping corresponding to the general formula

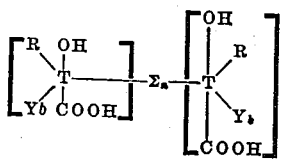

in which T represents an aromatic nucleus; R represents at least one alkyl group having at least twenty carbon atoms; Y represents a member of the group consisting of hydrogen, hydroxyl, ester, keto, alkoxy, aroxy, ether alcohol, aldehyde, xanthate, alkyl sulfide, oxime, amide, thioamide, carbamide, aralkyl, aryl, alkaryl, halogen, nitroso, amino, nitrosamine, amidine, imine, N-thio, diazo, hydrazine, cyano, azoxy, azo, and hydrazo radicals; $b$ represents the number of Y substituents and is equal to zero or a whole number corresponding to replaceable hydrogens on the nucleus T not substituted with R, OH, COOH, and $\Sigma_n$; $\Sigma$ represents an element selected from the group consisting of sulfur, selenium, and tellurium; and $n$ represents a whole number from one to four.

12. An improving agent for mineral oils and the like comprising an oil-miscible condensation product of a wax-substituted hydroxyaromatic acid in which at least two wax-substituted aryl nuclei are interconnected by at least one atom of an element from the group consisting of sulfur, selenium, and tellurium.

13. An improving agent for mineral oils and the like comprising an oil-miscible condensation product of a wax-substituted hydroxyaromatic acid in which at least two wax-substituted aryl nuclei are interconnected by at least one atom of sulfur.

14. An improving agent for mineral oils and the like comprising an oil-miscible sulfide of an alkyl-substituted hydroxyaromatic acid in which at least two substituted aryl nuclei are interconnected by at least one atom of sulfur and in which the alkyl substituent is derived from an aliphatic hydrocarbon having at least twenty carbon atoms.

15. An improving agent for mineral oils and the like comprising an oil-miscible sulfide of an alkyl-substituted hydroxyaromatic acid in which at least two substituted aryl nuclei are interconnected by at least one atom of sulfur and in which the alkyl substituent is derived from petroleum wax.

16. An improving agent for mineral oils and the like comprising an oil-miscible monosulfide of an alkyl-substituted hydroxyaromatic acid in which at least two substituted aryl nuclei are interconnected by an atom of sulfur and in which the alkyl substituent is derived from petroleum wax.

17. An improving agent for mineral oils and the like comprising an oil-miscible polysulfide of an alkyl-substituted hydroxyaromatic acid in which at least two substituted aryl nuclei are interconnected by at least two atoms of sulfur and in which the alkyl substituent is derived from petroleum wax.

18. An improving agent for mineral oils and the like comprising a wax-substituted phenolic acid sulfide in which at least two substituted phenolic acid nuclei are interconnected by at least one atom of sulfur.

19. An improving agent for mineral oils and the like comprising a wax-substituted naphtholic acid sulfide in which at least two substituted naphtholic acid nuclei are interconnected by at least one atom of sulfur.

20. An improving agent for mineral oils and the like comprising a condensation compound characterized by having at least once therein the grouping corresponding to the general formula

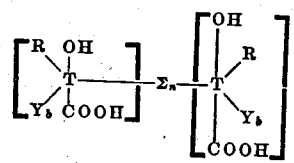

in which T represents an aromatic nucleus; R represents at least one alkyl group having at least twenty carbon atoms; Y represents a member of the group consisting of hydrogen, hydroxyl, ester, keto, alkoxy, aroxy, ether alcohol, aldehyde, xanthate, alkyl sulfide, oxime, amide, thioamide, carbamide, aralkyl, aryl, alkaryl, halogen, nitroso, amino, nitrosamine, amidine, imine, N-thio, diazo, hydrazine, cyano, azoxy, azo, and hydrazo radicals; $b$ represents the number of Y substituents and is equal to zero or a whole number corresponding to replaceable hydrogens on the nucleus T not substituted with R, OH, COOH, and $\Sigma_n$; $\Sigma$ represents an element selected from the group consisting of sulfur, selenium, and tellurium; and $n$ represents a whole number from one to four.

ORLAND M. REIFF.